United States Patent Office 2,990,385
Patented June 27, 1961

2,990,385
ALKYLOL PHENOL-MODIFIED COPOLYMERS OF VINYL MONOMERS AND UNSATURATED FATTY ACID-MODIFIED ALKYD RESINS
Alfred F. Schmutzler, Summit, N.J., assignor to France, Campbell & Darling, Incorporated, Kenilworth, N.J., a corporation of New Jersey
No Drawing. Filed Sept. 14, 1956, Ser. No. 609,796
9 Claims. (Cl. 260—22)

This invention relates to gel systems of fatty acid-modified alkyd resins and in particular to methods of preventing the formation of non-reversible gels of fatty acid-modified alkyd resins to retain their utility as protective and decorative coatings.

The formation of gels in the heat treatment of oils or in the preparation of fatty acid-modified alkyds or in the vinylation thereof occurs accidentally and usually comprises a total loss.

I have found that gelling in the course of heat treatment or copolymerization of the fatty acid-modified alkyds can be prevented by the addition of a reactive phenolic resin. I have further found that, by deliberately causing a fatty acid-modified alkyd to come to an incipient gel stage and then fluidizing the gel with the phenolic resin, new and useful products are formed.

Many of the gels form during or after the copolymerization of a fatty acid-modified alkyd with a reactive unsaturated monomer, usually referred to as monomers. They comprise vinyl chloride, vinyl acetate, allyl alcohol, allyl chloride, allyl acetate, styrene, methyl styrene, ethyl styrene, vinylxylene, vinylnaphthalene, vinyl pyridine, butene, butadiene, cyclopentadiene, dicyclopentadiene, isoprene, vinylphenol, vinylnaphthol, divinyl benzene, divinyl naphthalene, acrylonitrile, methyl acrylate, methyl methacrylate, ethyl acrylate, ethyl methacrylate, and the like. Their reaction with a fatty acid ester is usually called a "vinylation."

For a vinylation, the fatty acid-modified alkyd is selected on the basis of proper viscosity and proper degree of unsaturation so that speedy drying is imparted to the vinylated product. If the ester is not viscous enough, the vinylated product will not acquire the optimum consistency and satisfactory speedy drying properties. If the ester is just slightly too viscous, the vinylation with the optimum amount of monomer yields a useless gel.

Similarly, if the fatty acid has insufficient unsaturation, the drying properties of the vinylated product will be poor; and if there is too much unsaturation, the vinylation will produce a useless gel.

That gelling can be prevented by the addition of a reactive phenolic resin, such as a methylol phenol, without adversely affecting good drying properties. Furthermore, gels already formed can be redispersed by the addition of a suitable polymerizable phenolic resin.

It is thus one of the objects of this invention to prevent gelling of a fatty acid-modified alkyd during and after vinylation.

Another object of this invention is a new composition of matter comprising a reactive phenolic resin and a vinylated fatty acid-modified alkyd.

Another object of this invention is the redispersion of gels which might form accidentally or by design.

The advantages inherent to the vehicle manifest themselves in the protective and decorative coating. They are improved drying properties, improved chemical resistance, improved solvent resistance, improved water resistance, and better hardness or greater toughness. In addition, there are advantages obtainable due to greater viscosities possible in the fatty acid-modified alkyd.

There are additional advantages obtained specific to redispersed gels, such as better suspension of pigments and less settling in paints.

The reactive phenolic resin is most conveniently added when the first signs of gelling appear. Those signs are extremely large bubbling in the boiling batch and the batch wrapping itself around the stirrer. The addition of methylolphenol, for example, will stop further gelling and redisperse the gel system without destroying its non-penetrating characteristics on fibrous material.

The resulting redispersed gels are useful vehicles for coating paper, textiles, and other porous fibrous substances on which non-penetration of the coating often is desirable.

The reactive alkylol phenol may be added before vinylation of the alkyd or during the vinylation to prevent gelling. Additionally, the alkylol phenol may be added after the gel has formed to resolubilize the gel. The alkyol phenol may also be added after vinylation to inhibit gel formation during storage.

The alkylol phenol is a reactive polymerizable reaction product of an aldehyde, such as formaldehyde, acetaldehyde, or furfural, or aldehyde-yielding substances, such as hexamethylene tetramine, aldol, paraformaldehyde with phenols such as phenol, alkyl phenols and polyhydric phenols.

Some of the drying oil-modified alkyds, such as oiticica oil, tung oil, and fish oil, when reacted with acrylonitrile and other vinylnitriles have the tendency to become more viscous if stored in cans, drums, or tanks. This process continues until a gel is formed. The addition of as little as 0.1% of an alkylol phenol, for example, methylol phenol, considerably retarded gel formation as much as two months, when the addition was increased to 2%, no gelling occurred for more than 3 years.

Among the reactive phenolic resins, the mono and poly alkylol phenols and their soluble condensation products can be used, providing they are soluble in the fatty acid ester or in the solution of the fatty acid ester. For the vinylated esters made with styrene, vinyltoluene, cyclopentadine, isoprene, butadiene, and the like, and for the respective solutions in hydrocarbons, phenols with side chains of three and more carbon atoms are preferred. If the ester is vinylated with a vinyl nitrile, such as acrylonitrile, the alkylol phenols preferred are the derivatives of phenols with side chains of less than six carbon atoms. If the solvent in such vinylated esters is an alcohol, a ketone, an ether of a glycol, a nitrile, an ester of cyanamide or a similar strong solvent, then the suitable alkylol phenol is a derivative of phenylphenol, bisphenol, cumylphenol, dihydroxydiphenyl, dihydroxybenzophenone, a phenol with a side chain or less than four carbon atoms, or some other xylene insoluble alkylol phenol.

Among the "vinyl" compounds which are used in the vinylation of the unsaturated fatty acid-modified alkyds and which respond to the action of alkylol phenols are styrene, methyl styrene, chlorostyrenes, cyclopentadiene, dicyclopentadiene, butadiene, isoprene, butene, amylene, vinyl acetate, vinyl nitriles, vinyl chloride, divinyl phthalate, diallyl fumarate, diallyl maleate, vinyl esters of starch, allyl esters of starch, divinylbenzene, vinyl naphthalene, vinylpyridine, vinyl phenanthrene, and the like. With these "vinyl" compounds, the range between unsatisfactory drying combined with low viscosity and the state of gel formation can be greatly increased by the addition of an alkylol phenol. In many instances, the viscosity at which gelling ensues can safely be extended to a much higher viscosity, with resulting better drying properties than at normal viscosities.

The fatty acids can comprise the fatty acids derived from oils, fats, waste products in the manufacture of paper (tall oil), the hydrogenation of coal, or the oxidation of unsaturated petroleum. Among them, the unsaturated fatty acids are preferred. Suitable acids include acids derived from soybean oil, castor oil, tung oil, linseed oil, fish oil, and the like.

The alkyds comprise the condensation products of polyhydric alcohols with polycarboxylic acids. The polyhydric alcohols include ethylene glycol, vinylglycol, propylene glycol, butylene glycol, pentylene glycol, hexylene glycol, polyglycols, glycerol, diglycerol, trimethylol ethane, trimethylolpropane, butanetriol, pentanetriol, hexanetriol, heptanetriol, octanetriol, polytriols, pentaerythritol, dipentaerythritol, tripentaerythritol, pinacol, arabitol, xylitol, adomitol, mannitol, dulcitol, methyl glucoside, and condensation products of phenyl-diglycidyl ethers, such as Epon 1004, Epon 1007.

The polybasic acids include phthalic acid, naphthalene dicarboxylic acid, diphenic acid, benzenetricarboxylic acid, naphthalene, tricarboxylic acid, citric acid, adipic acid, succinic acid, glutaric acid, sebacic acid, pimelic acid, tartaric acid, malic acid, maleic acid, fumaric acid, itaconic acid, aconitic acid, and the like.

In the preparation of these, the polyhydric alcohols can be used singly or in combination; and similarly the polybasic acids can be used singly or in combination in the presence of fatty acids or blends of fatty acids. The individual components other than the unsaturated reagents apparently do not adversely affect the redispersion action, whereas the unsaturations of the fatty acid, polybasic acid or complex alcohols seem to determine the tendency of gel formation. There appears to be a relation between the amount of alkylol phenol required and the degree of unsaturation of the compound. The greater unsaturation causes the gels to form more readily and requires more alkylol phenol for preventing a gel.

The action of the alkylol phenols in redispersing a gel or in preventing gel formation is obscure in view of their instability. Even at room temperature, the methylolphenols slowly condense to phenolic resins. At elevated temperatures, the reaction is much quicker. At 260° F. to about 600° F., which is the temperature range for the heat-treating of oils and the preparation of alkyds and vinylated alkyds, the methylolphenols apparently convert to phenolic resins very quickly.

When a vinylated alkyd starts to gel during processing, heating is preferably stopped and cooling is started while an anhydrous alkylol phenol or its solution is added slowly. As soon as the gel becomes fluid, it should be dispersed in the proper amount of solvent.

The following examples will serve to illustrate the invention in further detail, but it is understood that the specific enumeration of detail is by way of illustration only and is not to be interpreted as a limitation in the case:

*Example 1*

In a suitable kettle for resin manufacturing, an ester is prepared by reacting 450 parts of soybean oil fatty acids, 300 parts of castor oil, 360 parts of phthalic anhydride, 73 parts of neopentyl glycol, and 186 parts of pentaerythritol were reacted at 280° C. to obtain an alkyd resin, whose 70% solution in xylene had an acid number of about 6 and a viscosity of about 5 poises.

210 parts of this alkyd resin were dissolved in 246 parts of xylene, 175 parts of monomeric styrene, 2 parts of ditertiary-butyl peroxide and the solution was heated so that its solvents boiled while the vapors were condensed, separated from any water, and the condensate was returned to the boiling solution. After 5 hours, the solution started to gel.

*Example 2*

In a suitable kettle, 50 parts of butylphenol-formaldehyde reaction product (a mixture of monomeric monomethylol phenol and monomeric dimethylol phenol made by heating 1 mole of tertiarybutylphenol with the equivalent of 1.8 moles of formaldehyde as Formalin in the presence of ¼ mole of sodium hydroxide for 24 hours at 45° C. and then separating it from water at a pH of about 7) were mixed with the gel of Example 1 ten minutes after gelling began. During mixing the gel which had accumulated around the agitator and had crept about two feet up the shaft gradually started to become liquid again and flowed gradually into the fluidized mixture. After two hours, a uniform dispersion was obtained, which applied as a three-mil film on filter paper, dried to a glossy film.

*Example 3*

In a suitable kettle, 210 parts of the alkyd resin of Example 1, 20 parts of a butylphenol-formaldehyde condensation product, as used in Example 2, where dissolved in 258 parts of xylene, 175 parts of monomeric styrene, 2 parts of ditertiarybutyl peroxide, and the solution was heated so that the solvents boiled while the vapors were condensed, separated from any water and returned to the boiling solution. After eight hours, the resulting resin solution had a viscosity of about 36 poises. It was uniform and showed no signs of gel formation.

*Example 4*

In a suitable kettle, 210 parts of alkyd resin of Example 1, 40 parts of methylolbutylphenol, as made in Example 2, were dissolved 282 parts of xylene, 175 parts of monomeric styrene, and 2 parts of ditertiarybutyl peroxide. The solution was heated so that the solvents boiled while the vapors were condensed, the condensed solvents were separated from any water and returned to the boiling solution. After boiling for six hours, the viscosity was about 4 poises. After gradually adding 4 parts of maleic anhydride in four portions over a period of two hours, the resulting viscosity was about 35 poises.

*Example 5*

In a suitable kettle, 360 parts of phthalic anhydride, 300 parts of castor oil, 450 parts of soybean oil fatty acid, 73 parts of ethylene glycol and 186 parts of pentaerythritol are reacted at about 540° F. in order to dehydrate the castor oil and prepare an alkyd resin with an acid number of 6.4 and a viscosity of about 5 poises as a 70% solution in xylol. 210 parts of the resulting alkyd resin were dissolved in 248 parts of xylene, 175 parts of styrene, 3.4 parts of ditertiarybutyl peroxide; and the solution was heated so that its solvents boiled while the vapors were condensed, separated from any water, and the condensate was returned to the boiling solution. After 2 hours of boiling, the solution started to gel, whereupon 50 parts of butylphenol-formaldehyde reaction product, as used in Example 2, were added. After 2 hours of stirring, without further heating, a homogeneous solution resulted which, after thinning to a 10% solution, had good non-penetration characteristics.

*Example 6*

210 parts of the alkyd resin of Example 5 were dissolved in 262 parts of xylene, 10 parts of methylolbutyl phenol as used in Example 2, 175 parts of styrene and 1.6 parts of ditertiarybutyl peroxide; and the solution was heated so that its solvents boiled while the vapors were condensed, separated from any water and returned to the boiling solution. After 4½ hours, the solution had a viscosity of about 50 poises and was close to gelling. Then, 20 parts of methylolbutyl phenol, as used in Example 2, were gradually added to the boiling solution. After boiling for an additional 4 hours, the vehicle was still a smooth flowing liquid without showing signs of gelling. It had fair non-penetration characteristics slightly inferior to those of the vehicle of Example 5.

*Example 7*

210 parts of the alkyd resin of Example 5 were dissolved in 282 parts of xylene, 175 parts of styrene, 1.6 parts of ditertiarybutyl peroxide, and 40 parts of methylolbutylphenol, as used in Example 2; and the solution was heated so that its solvents boiled while the vapors were condensed, separated from any water and returned to the boiling solution. After 5 hours of boiling, the viscosity was about 5 poises.

It has been found that the polymerizable alkylol phenol is operative to prevent gelling of the alkyd over wide range of concentrations. Thus, as little as 1/10 of 1% of methylol phenol stabilizes alkyds in storage for a considerable period while much higher percentages of alkylol phenol based on the weight of the alkyd are miscible and impart desirable properties to the alkyd. It has been found, for example, as much as 40% methylol phenol may be used.

While the invention has been illustrated in terms of certain examples, these examples are not to be construed as limiting. It is intended to cover such modifications within the skill of the art that fall within the spirit and scope of the appended claims.

I claim:

1. A composition of matter comprising a major amount of a copolymer of a vinyl monomer and an unsaturated fatty acid-modified alkyd resin and a minor amount of at least a gel inhibiting quantity of an alkylol phenol selected from the class consisting of a monomeric monomethylol phenol and a monomeric dimethylol phenol and mixtures thereof.

2. A composition comprising a solution in hydrocarbon solvent of a major amount of a copolymer of a vinyl monomer and an unsaturated fatty acid-modified alkyd resin and a subsequently added minor amount of an alkylol phenol selected from the class consisting of a monomeric monomethylol phenol and a monomeric dimethylol phenol and mixtures thereof, said solution being stable and non-gelling.

3. The method of preventing gel formation in a solution of a copolymer of a vinyl monomer and an unsaturated fatty acid-modified alkyd resin comprising adding to said solution a minor amount of an alkylol phenol selected from the class consisting of a monomeric monomethylol phenol and a monomeric dimethylol phenol and mixtures thereof.

4. The method of solubilizing a copolymer of a vinyl monomer and an unsaturated fatty acid-modified alkyd resin in gel form in a solvent comprising adding a minor amount of an alkylol phenol selected from the class consisting of a monomeric monomethylol phenol and a monomeric dimethylol phenol and mixtures thereof, to said solvent and gel and heating and agitating the resulting mixture until said gel dissolves in the solvent.

5. The composition set forth in claim 1 wherein said copolymer comprises an interpolymerization product of monomeric styrene with an unsaturated fatty acid-modified glycol phthalate alkyd.

6. The composition set forth in claim 1 wherein said alkylol phenol comprises a mixture of a monomeric monomethylol phenol and a monomeric dimethylol phenol.

7. The composition set forth in claim 2 wherein said copolymer comprises an interpolymerization product of monomeric styrene with an unsaturated fatty acid-modified glycol phthalate alkyd.

8. The composition set forth in claim 2 wherein said alkylol phenol comprises a mixture of a monomeric monomethylol phenol and a monomeric dimethylol phenol.

9. A porous object coated with the composition of claim 2.

References Cited in the file of this patent

UNITED STATES PATENTS

| | | |
|---|---|---|
| 2,313,726 | Atwell | Mar. 16, 1943 |
| 2,600,457 | Wynstra | June 17, 1952 |
| 2,626,249 | Honel | Jan. 20, 1953 |
| 2,695,896 | Ehring | Nov. 30, 1954 |